US012430649B2

United States Patent
Rai et al.

(10) Patent No.: US 12,430,649 B2
(45) Date of Patent: Sep. 30, 2025

(54) SYSTEMS AND METHODS FOR SMART REMEDIATION FOR TRANSACTIONS

(71) Applicant: STRIPE, INC., South San Francisco, CA (US)

(72) Inventors: Arash Rai, Seattle, WA (US); Ryan Drapeau, Seattle, WA (US)

(73) Assignee: Stripe, Inc., San Francisco, CA (US)

( * ) Notice: Subject to any disclaimer, the term of this patent is extended or adjusted under 35 U.S.C. 154(b) by 166 days.

(21) Appl. No.: 17/980,907

(22) Filed: Nov. 4, 2022

(65) Prior Publication Data

US 2024/0152924 A1 May 9, 2024

(51) Int. Cl.
*G06Q 20/40* (2012.01)
*G06Q 20/34* (2012.01)

(52) U.S. Cl.
CPC ....... *G06Q 20/4016* (2013.01); *G06Q 20/407* (2013.01); *G06Q 20/34* (2013.01)

(58) Field of Classification Search
CPC ............ G06Q 20/4016; G06Q 20/407; G06Q 20/34; G06Q 20/389; G06Q 20/4093
USPC .......................................................... 705/75
See application file for complete search history.

(56) References Cited

U.S. PATENT DOCUMENTS

| | | | | |
|---|---|---|---|---|
| 11,436,603 | B2 * | 9/2022 | Roche | G06Q 20/102 |
| 2008/0140576 | A1 * | 6/2008 | Lewis | G06Q 30/02 |
| | | | | 707/999.107 |
| 2012/0158540 | A1 * | 6/2012 | Ganti | G06Q 30/0185 |
| | | | | 705/26.35 |
| 2013/0218758 | A1 * | 8/2013 | Koenigsbrueck | G06Q 40/02 |
| | | | | 705/39 |
| 2020/0302446 | A1 * | 9/2020 | Kledaras | G06Q 20/4016 |
| 2022/0215393 | A1 * | 7/2022 | Lenkala | G06Q 20/4015 |

* cited by examiner

*Primary Examiner* — Zeshan Qayyum
(74) *Attorney, Agent, or Firm* — Foley & Lardner LLP

(57) ABSTRACT

Systems and methods for smart remediation of transactions are disclosed. A payment processing system receives information of a first transaction with a merchant. The system approves the first transaction and identifies a monitoring period which may be a set amount of time after the approval of the first transaction. The system collects data of one or more second transactions during the monitoring period, and provides the data to a machine learning model. The machine learning model determines a first fraud score indicative of fraud for the first transaction. A fraud threshold may be identified based on one or more merchant profiles. If the first fraud score is above the first fraud threshold, a refund may be provided for the first transaction.

20 Claims, 5 Drawing Sheets

SYSTEMS AND METHODS FOR SMART REMEDIATION FOR TRANSACTIONS

BACKGROUND

Acceleration of e-commerce transactions has also increased the amount of online credit card fraud. Fraudsters have become more and more sophisticated in finding ways to exploit, for example, weaknesses of a payment processing system, to avoid an online charge from being blocked as fraudulent.

The above information disclosed in this Background section is only for enhancement of understanding of the background of the present disclosure, and therefore, it may contain information that does not form prior art.

SUMMARY

In one or more embodiments, the present disclosure is directed to systems and methods for providing smart remediation for fraudulent transactions, substantially as shown in and/or described in connection with at least one of the figures, as set forth more completely in the claims. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
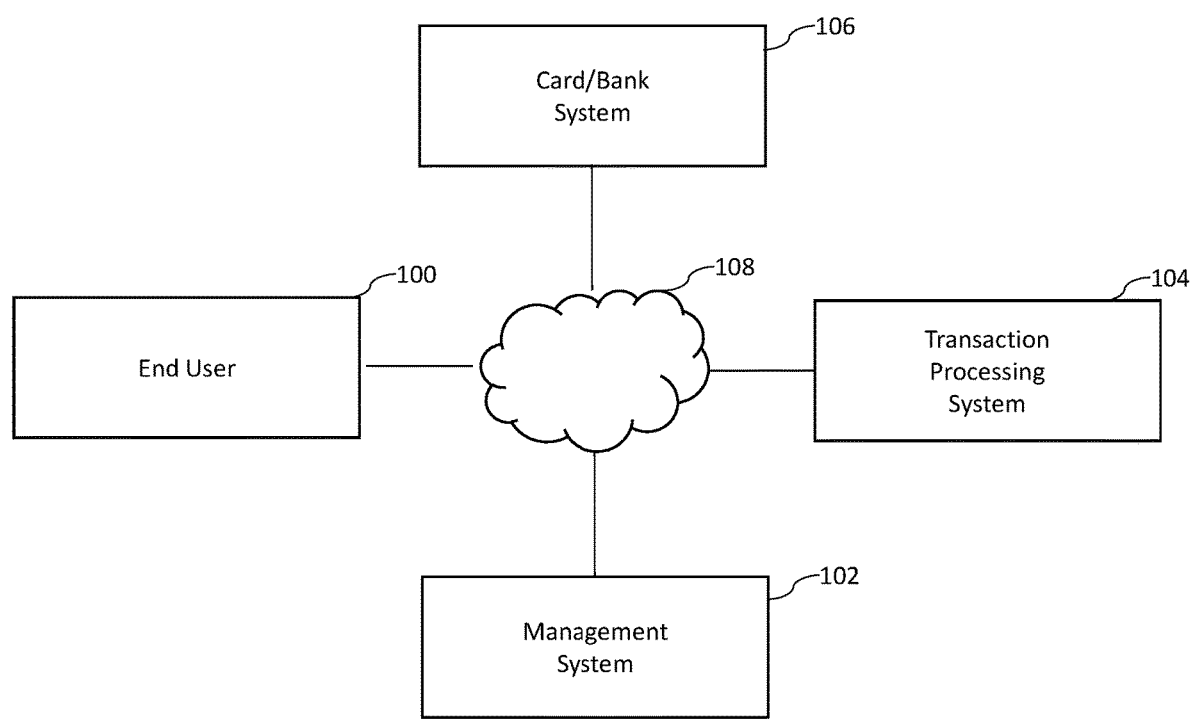
FIG. 1 depicts a computing environment for detecting fraud according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Fraudsters have become increasingly more sophisticated in engaging in credit card fraud. For example, fraudsters may use sophisticated ways to hack into a business' computer system to steal a customer's credit card and other personal information. The fraudsters may then use the stolen credit card information to engage in fraudulent purchase transactions with a merchant. When the cardholder discovers the fraudulent transaction, he may question the payment by filing a dispute with the credit card company. If the payment is found to be fraudulent because it was not authorized by the cardholder, the merchant may be liable for the loss of goods and other fees (e.g., chargeback fees) associated with the fraudulent transaction.

One way to combat credit card fraud may be to employ rules to identify and block charges that satisfy the parameters set forth by the rules. The logic employed by a rules-based fraud detection may be "If x happens, then do y." For example, rules may be set up to block all transactions from a certain country, IP address, or above a certain dollar amount. Rule-based fraud detection, however, may not recognize hidden patterns nor adapt to increasing sophistication by fraudsters in committing fraud.

In addition, different merchants, however, may require different types of rules depending on their fraud tolerance levels. Certain merchants may need to be more aggressive in stopping potential fraud than other merchants. For example, for businesses with low margins (e.g., merchants that sell food online, etc.), the cost of authorizing a fraudulent sale (false negative) may be expensive, and may need to be offset with hundreds of good transactions. Businesses with low margins may therefore want more aggressive rules in attempting to stop potential fraud. For businesses that have higher margins (e.g., merchants that sell software licenses, provide streaming services, sell high end watches, etc.), the reverse may be true. The lost revenue from blocking one legitimate transaction (false positive) may outweigh the cost of increased fraud. Manually altering the rules for each type of merchant may be an arduous task.

Machine learning may be used to help learn more nuanced patterns of fraud to help minimize false negative and false positive predictions. A machine learning model may be trained, using training and transaction data, to discern legitimate transactions from those that are potentially fraudulent. In this regard, one or more input data associated with a transaction may be provided to the machine learning model to determine a probability that the transaction is fraudulent. In some situations, however, there may be data or patterns detected after completion of a transaction, which may have altered the prediction made by the machine learning model. Having a correct prediction even after a purchase transaction has been authorized due to a false negative prediction may be useful for certain merchants, and may help avoid loss of goods or associated fees.

In general terms, embodiments of the present disclosure are directed to systems and methods for providing smart remediation for fraudulent transactions. The system may receive a first purchase transaction from a merchant system, and evaluate the received information to clear, approve, validate, or authorize (collectively referred to as approve) the first transaction. The first transaction may be for goods or services offered by the merchant. A credit card may be used to pay for the transaction. If a fraudster is involved, the credit card information may be for a stolen credit card, and the transaction may not be authorized by the credit card holder. In this case, the transaction may be deemed to be fraudulent.

It should be appreciated that although credit card is used in the various examples of the payment vehicle used to pay for a transaction, embodiments of the present disclosure are not limited thereto, and may extend to other payment types, such as, for example, debit cards, Automated Clearing House (ACH) payments, cryptocurrencies, digital wallet payments, and/or the like.

In some embodiments, the system may evaluate the first transaction information to make a pre-charge fraud determination. In this regard, the system may determine a pre-charge fraud score prior to approving the first transaction. A machine learning model may receive the first transaction information, and output a prediction as to whether the first transaction is fraudulent. The prediction may be associated with a confidence or probability value. The confidence or probability value may be used to compute the pre-charge fraud score. If the pre-charge fraud score is below a pre-charge fraud threshold, the first transaction may be approved as non-fraudulent. Information on the first transaction may then be provided to an issuing credit card or bank system for further approval. Funds may be moved from the issuing bank to a payment processing bank in response to the credit card being approved for the requested charge amount.

In some embodiments, approval of the first transaction triggers data collection for one or more second transactions associated with the credit card used for the first transaction. The data may be collected during a monitoring period. The monitoring period may be, for example, 24-hours following approval of the first transaction, although embodiments are not limited thereto, and may be longer or shorter than 24 hours. The data collected during the monitoring period may be used to reevaluate the fraud determination of the first transaction.

The type of data collected for the second transaction may be similar or different from the type of data used to make the pre-charge fraud determination. For example, the collected data during the monitoring period for a post-charge fraud determination may include velocity of charges using the credit card, Internet Protocol (IP) addresses used for the second transactions, other addresses associated with the second transactions, fraud determination for the first and/or second transactions, information gathered from the merchant's website during the first and/or second transactions, and/or the like.

The collected data may be provided to a post-charge fraud model (e.g., a first machine learning model) for making a post-charge fraud determination. The post-charge fraud model may be independent from the pre-charge fraud model. The post-charge fraud model may be trained to reevaluate the first transaction based on the collected data, and to output a post-charge fraud score.

In some embodiments, the post-charge fraud score is compared against a fraud threshold that may be customized to the merchant. The lower the threshold, the more aggressive the determination of fraud. Information about the merchant in one or more merchant profiles may be used to compute a customized post-charge fraud threshold. The one or more merchant profiles may be generated for the merchant based on information provided by the merchant, information gathered by the system based on transactions processed for the merchant, knowledge about the merchant type, and/or the like. In some embodiments, the one or more merchant profiles include a risk profile, margin profile, and/or recuperation profile. The risk profile may indicate a fraud risk level for the merchant. For example, if the merchant is taking proactive steps to prevent fraud, the risk profile for the merchant may be low. The margin profile may include expected margins for the type of goods or services sold by the merchant. The recuperation profile may indicate a level of recoverability for the goods and services sold by the merchant in the event of a refund.

In some embodiments, a remediation action for the first transaction is taken in response to the post-charge fraud score being higher than the merchant's fraud threshold. In some embodiments, one or more possible remediation actions may be recommended to the merchant, and the merchant may select the remediation action to take. The recommended remediation actions may be customized based on the customer profile, transaction type, and/or the like. The remediation action may be, for example, providing a refund on the purchased good or service, and taking steps to avoid loss (or further loss) of the good or service. For example, shipping of a tangible good may be stopped, keys or licenses for software goods may be revoked, services (e.g., streaming services) may be stopped, and/or the like.

A remediation action may also be to contact the customer to verify the transaction. For example, the customer may be requested to upload a picture of the credit card that was used, enter a verification pin sent by the bank, and/or the like. If a refund has been issued to the customer and the transaction has been canceled, an email may be sent to the customer with the option to re-purchase the product (e.g., using a different credit card).

FIG. 1 depicts a computing environment for detecting fraud according to one or more embodiments. The computing environment includes an end user device 100, merchant system 102, credit card or bank (collectively referred to as bank) system 106, and a transaction analysis system 104 coupled to one another over a data communications network 108. The data communications network 108 may be any wired or wireless local area network (LAN), private wide area network (WAN), and/or the public Internet. The merchant system 102, transaction analysis system 104, and bank system 106 may be hosted in a single server, or distributed over multiple servers under the control of a single or multiple organizations.

The end user device 100 may be a desktop, laptop, mobile device, smart phone, tablet, and/or any other computing device conventional in the art. A customer, potential customer, fraudster, or other end user (collectively referenced as an end user) desiring to purchase goods or services from a merchant may access the merchant system 102 using the end user device 100.

The merchant system 102 may include one or more servers and/or computing devices. The servers and/or computing devices may include a processor and memory. The memory may include instructions that, when executed by the processor, cause the processor to provide merchant functionality as described herein. For example, the merchant system 102 may provide a web page or application that enables the end user to purchase goods and/or services (collectively referenced as products) sold by the merchant.

In some embodiments, the merchant system 102 includes a point-of-sale (POS) terminal at a merchant location. The POS terminal may include a processor and memory. The memory may store instructions that cause the process to provide checkout functionality for products purchased by an end user from the merchant location. For example, the POS terminal may include software and hardware for accepting credit card information, forwarding the credit card information and associated purchase details to the transaction processing system 104 for approval, and displaying an indication as to whether the credit card has been approved or declined for the requested purchase amount.

In some embodiments, the merchant system 102 communicates with the transaction processing system 104 for processing payment for the products purchased by the end user (either online via the web page or application, or via the POS terminal). The merchant system 102 may collect the transaction information, such as, for example, customer information (e.g., name, shipping address, billing address, and the like), credit card information, purchase amount, and/or the like, and transmit the transaction information to the transaction processing system 104.

The transaction processing system 104 may include a processor and a memory, where the memory includes instructions that cause the processor to provide transaction processing functionality described herein. The transaction processing functionality may include, for example, analyzing transactions for potential fraud, interacting with the bank system 106 for approving or declining the transactions, and interacting with the merchant systems 102 for configuring merchant profiles, payment pages, and/or the like.

The analysis of transactions for potential fraud may be before the transaction is approved (e.g., by the bank system 106) during a pre-charge fraud detection process. In some embodiments, the analysis of transactions for potential fraud also occurs after the transaction is approved in a post-charge fraud detection process. The post-charge fraud analysis may increase fraud detection accuracy when compared to a system that only engages in pre-charge analysis. The increased fraud detection accuracy may have a technical effect of avoiding potential charge disputes for fraudulent transactions that may consume network and/or telecommunications resources. Detecting the fraud after the purchase transaction has been approved may also have a real-world effect of avoiding use of shipping and transportation resources for delivering products that were not authorized for purchase.

In some embodiments, the bank system 106 may include software, hardware, and network interfaces for determining whether a credit card may be approved for a requested purchase amount. In this regard, the bank system 106 may check the credit card number, security code, credit limit, expiration date, and/or other information for approving or declining the purchase. The bank system 106 may also engage in its own fraud assessment to approve or decline the purchase.

If the credit card is approved, an approval message may be transmitted to the transaction processing system 104 which in turn may notify the merchant system 102 of the approval. The bank system 106 may also engage in the transfer of funds from the issuing bank to a recipient bank, in response to the credit card being approved.

Figure 2:
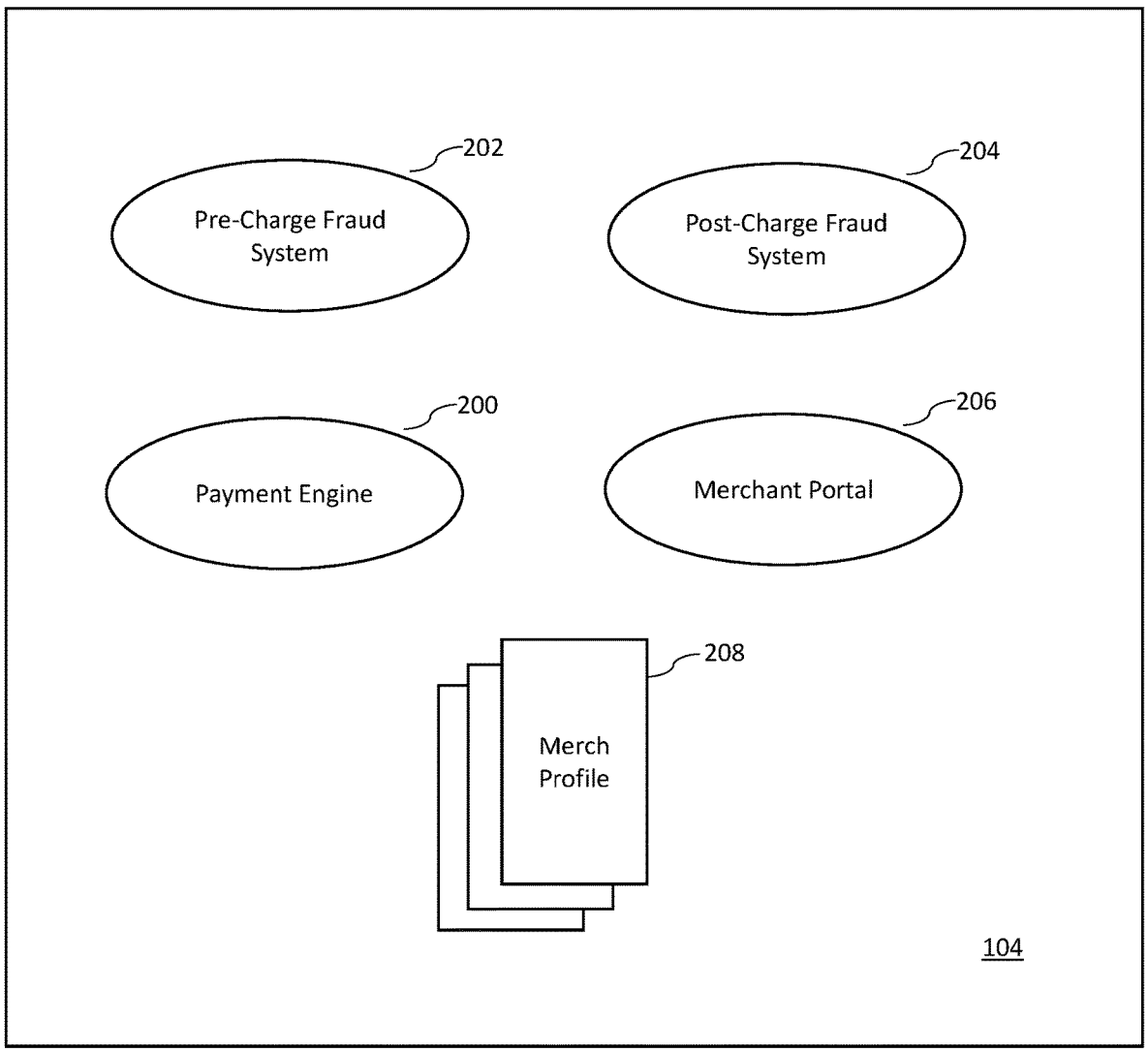
FIG. 2 depicts a block diagram of a transaction processing system according to one or more embodiments.

FIG. 2 depicts a block diagram of the transaction processing system 104 according to one or more embodiments. The transaction processing system 104 may include a payment engine 200, pre-charge fraud detection system 202, post-charge fraud detection system 204, merchant portal 206, and one or more merchant profiles 208. Although the payment engine 200, pre-charge fraud detection system 202, post-charge fraud detection system 204, and merchant portal 206 are depicted in FIG. 2 as separate components, a person of skill in the art should recognize that these components 200-206 may be combined into a single component, or one or more of the components may be further subdivided into additional sub-components as will be appreciated by a person of skill in the art.

The payment engine 200 may be configured to process a transaction for payment. The payment engine 200 may receive information about the transaction such as the credit card information (e.g., number, type, expiration date, and security code), purchase amount, customer name, billing address, shipping address, and/or the like. The information may be collected from a checkout page provided by the payment engine 200 and displayed by the merchant system 102. The payment information may also be collected in alternate ways, such as, for example, via a POS terminal, an electronic wallet of the customer's electronic device, and/or the like. The payment engine 200 may engage in basic checks of the credit card information, such as verifying a correct number of digits in the credit card number, valid expiration dates, and/or the like.

In some embodiments, the payment engine 200 interacts with the pre-charge fraud detection system 202 for determining whether the requested transaction is fraudulent. The payment engine 200 may forward the collected transaction data to the pre-charge fraud detection system 202 and receive approval or denial of the transaction.

In some embodiments, the payment engine 200 interacts with the bank system 106 for further approval of the transaction. The bank system 106 may check the credit card information, check credit limits, and engage in its own fraud assessment prior to approving the transaction. If the credit card is approved for the purchase amount, the bank system 106 may transmit an appropriate message to the payment engine 200, and initiate a transfer of funds from the credit card issuing bank, to a bank associated with the transaction processing system 104, for ultimate payout to the merchant's bank. The payout to the merchant may occur, for example, on a periodic basis.

The pre-charge fraud detection system 202 may include a first machine learning model for determining whether a credit card transaction is fraudulent. The transaction may be fraudulent if it is not authorized by the credit card holder. The first machine learning model may be trained to detect fraudulent transactions based on input features and known labels (e.g., fraudulent or not fraudulent). The training of the first machine learning model may be via regression, decision trees, random forests, deep neural networks, and/or the like.

In some embodiments, the pre-charge fraud detection system 202 receives information of a first transaction (e.g., from the payment engine 200), and extracts features to be input into the first machine learning model. The features may include a credit card number, a credit card type, number of transactions using the credit card in the past N days, IP addresses of the past transactions, email addresses of the past transactions, billing and shipping addresses, charge amounts, and/or the like. For example, a shipping address different than a billing address may signal fraud. In another example, multiple orders from the same IP address within a short period of time may signal fraud. In yet another example, a charge amount from a first-time buyer that exceeds a typical charge amount for new customers may also signal fraud.

The pre-charge fraud detection system 202 may output a predicted classification for the first transaction as being fraudulent or not. A confidence value may also be output for the predicted classification. For example, a transaction may be deemed to be fraudulent with an 80% confidence. A pre-charge fraud likelihood score may be computed based on the prediction. For example, the fraud likelihood score may be the confidence value normalized to a set scale (e.g., 0.0-1.0), where higher the scale, the higher the likelihood of fraud.

In some embodiments, the pre-charge fraud detection system 202 is configured to flag the first transaction if the fraud score is higher than a set pre-charge fraud threshold.

The flagged transaction may be blocked or further reviewed (e.g., manually) by the merchant or fraud expert. An appropriate message may be transmitted to the payment engine 200 in response to the pre-charge fraud detection determination.

The post-charge fraud detection system 204 may include a second machine learning model for reassessing an approved purchase transaction (the first transaction), and determining, based on data collected after the approval of the first transaction, whether the transaction was fraudulent. In some embodiments, the second machine learning model is independent from the first machine learning model that is used by the pre-charge fraud detection system 202. In some embodiments, the second machine learning model is the same as the first machine learning model.

The second machine learning model may be trained and maintained separately from the first machine learning model. The training of the second machine learning model may be via regression, decision trees, random forests, deep neural networks, and/or the like. If used, a deep neural network may be divided into two or more layers, such as an input layer that receives input features, an output layer that outputs a fraud classification, and one or more intermediate layers. The layers of the neural network may represent different groups or sets of artificial neurons which may represent different functions performed on the input features to determine fraud. The artificial neurons may apply different weights in the functions applied to the input features to attempt to predict whether the first transaction is fraudulent.

In some embodiments, the training data for the second machine learning model is similar to the training data used to train the first machine learning model. In some embodiments, additional training data is used, such as pre-charge fraud scores of transactions, information gathered during a checkout process, and/or other post-charge transaction data.

In some embodiments, the second machine learning model is invoked by the payment engine 200, for making a post-charge fraud prediction for the first transaction. In this regard, the post-charge fraud detection system 204 receives information of the first transaction (e.g., from the payment engine 200), and extracts features for being input into the second machine learning model. The features may be the same and/or different from the features input to the first machine learning model.

In some embodiments, the input features to the second machine learning model include post charge data of one or more second transactions collected during a monitoring period after the first transaction has been approved. The monitoring period may be, for example, 24 hours after approval of the first transaction, although embodiments are not limited thereto, and may be longer or shorter than 24 hours.

The post charge feature data may include, for example, velocity of the second transactions during the monitoring period, addresses (e.g., IP, email, billing, mailing) associated with the second transactions, charge amounts, block rate for the second transactions, and/or other data that may be used as input for a pre-charge fraud determination.

In some embodiments, the pre-charge fraud score for the first transaction is included as an input feature that helps predict whether the first transaction was indeed fraudulent. For example, the higher the first pre-charge fraud score, the higher the likelihood that the first transaction was actually fraudulent.

In some embodiments, the pre-charge fraud scores of the second transactions that occur post-charge are also included as input features that help predict whether the first transaction was fraudulent. For example, the larger the average of the pre-charge fraud scores, or the quicker the increase of the pre-charge fraud scores for the second transactions, the more likely the first transaction was fraudulent.

In some embodiments, if a particular one of the second transactions was blocked, the reason for the blocking is used as input feature data to the second machine learning model. For example, a particular transaction that is blocked due to the user typing a wrong security code may be interpreted differently for determining fraud from a transaction that is blocked due to the user inputting a shipping address different from the billing address.

In some embodiments, information gathered during a checkout process of the first and/or second transactions is used as further input feature data to the second machine learning model. For example, the payment engine 200 may collect checkout data such as the manner of input of the credit card number, the amount of time spent on the checkout page, whether coupons were used, the type of browser used to do the checkout, and/or the like. If a fraudster is involved, the credit card number may be pasted instead of typed, and the time spent on the checkout page may be shorter than an average amount of time spent by a legitimate customer.

In some embodiments, the second machine learning model outputs a classification as to whether the first transaction is fraudulent, based on the input features. A confidence value may also be output for the predicted classification. A post-charge fraud likelihood score may be generated based on the prediction. For example, the fraud likelihood score may be the confidence value normalized to a set scale (e.g., 0.0-1.0), where higher the scale, the higher the likelihood of fraud.

In some embodiments, the post-charge fraud score is compared against a post-charge fraud threshold identified for the merchant. In some embodiments, the post-charge fraud threshold is computed by a threshold computing algorithm based on one or more merchant profiles 208. The one or more merchant profiles 208 may be stored in a database of the transaction processing system 104 in association with the merchant.

In some examples, the threshold computing algorithm may initially assign a default threshold to the merchant. The threshold computing algorithm may increase or decrease the default threshold based on the one or more merchant profiles 208. In this regard, the post-charge fraud threshold for one merchant (or one type of merchant) may be different from the post-charge fraud threshold for another merchant (or another type of merchant). Updates may be made to the computed post-charge fraud threshold when changes are detected to the one or more merchant profiles 208.

In some embodiments, the one or more merchant profiles 208 include a risk profile, margin profile, and/or recuperation profile. The risk, margin, and/or recuperation profiles may be combined into a single merchant profile, or further divided into additional sub-profiles as will be appreciated by a person of skill in the art.

The risk, margin, and/or recuperation profiles (collectively referenced as a merchant profile) 208 may be generated based on information provided by the merchant via the merchant portal 206. The merchant portal 306 may provide a graphical user interface (GUI) or application programming interface (API) that may be accessed by the merchant system 102 to provide input data (e.g., merchant profile data) to the transaction processing system 104, and to receive output data (e.g., remediation recommendations) from the transaction processing system. The access of the merchant portal 306 may be over the data communications network 108.

In some embodiments, the merchant profile 208 may include a recuperation level indicative of the recoverability of the goods or services sold by the merchant. Certain goods or services may be more recuperable than other goods or services if the transaction were reversed or refunded. For example, a tangible good that requires shipping to the customer may be recovered by the merchant if the transaction is refunded prior to shipping. On the other hand, some types of services (e.g., a ride share service) that is provided prior, or as soon as the transaction is approved, may not be recovered even if the transaction were reversed or refunded. In some embodiments a threshold computing algorithm may be programmed so that the higher the recuperation level, the lower the fraud threshold to be more aggressive in the post-charge fraud determination.

In some embodiments, the merchant profile 208 includes information on expected margins for goods or services sold by the merchant. The margin information may be provided by the merchant or deduced based on merchant type. For example, a merchant selling grocery items online may have a margin level set as low, and a merchant selling software licenses may have a margin level set as high. In some embodiments, the threshold computing algorithm may be programmed so that the higher the margin level, the higher the fraud threshold, as the losses from the fraud are lower, allowing the merchant to take advantage of the lower losses by blocking less.

In some embodiments, the merchant profile 208 includes a fraud risk level for the merchant. For example, if the merchant has been the victim of more than average fraudulent transactions, the fraud risk level for the merchant may be deemed to be higher than for average merchants, and the threshold computing algorithm may lower the fraud threshold for the merchant to be more aggressive in the post-charge fraud determination. If the merchant has been proactive in trying to avoid fraud (e.g., by enrolling in other fraud monitoring programs), the fraud risk level for the merchant may be deemed to be lower than for average merchants, and the threshold computing algorithm may increase the fraud threshold to be less aggressive in the post-charge fraud determination.

The merchant may also manually set a desired post-charge fraud threshold via the merchant portal 206. The user-selected threshold may be used alone or in conjunction with the threshold determined by the threshold computing algorithm, to determine whether a transaction associated with the merchant having a particular post-charge fraud score should be flagged as fraudulent.

In some embodiments, it may be expensive (e.g., in terms of computer and network resources) for the post-charge fraud detection system 204 to rescore each approved transaction. In order to ensure a more efficient use of the computer and network resources, the post-charge fraud detection system 204 may execute a selection algorithm to select one or more of the approved transactions to be rescored, or to determine their priorities. In some embodiments, the selection algorithm assigns a rank or priority to the transactions based on one or more criteria, and selects a set number of the transactions with the highest priorities. The criteria may be, for example, the pre-charge fraud scores assigned to the transactions, where the higher the pre-charge fraud score, the higher the priority.

In some embodiments, the selection algorithm ignores a transaction for rescoring if no charges on the credit card are detected during the monitoring period after the initially approved charge. If one or more charges are detected on the credit card during the monitoring period, a priority may be assigned to the transaction based on the number of charges (e.g., the larger the number of charges, the higher the priority). In some embodiments, other information about the credit card may trigger the rescoring of the transaction, such as, for example, if the card was subject to a security breach. In some embodiments, information about the merchant may also determine whether transactions with the merchant are rescored. For example, transactions for new merchants may be ranked higher than transactions for established merchants.

The post-charge fraud detection system 204 may identify one or more remediation actions if a rescored transaction is identified to be fraudulent. The remediation action may be, for example, to issue a refund, contact the customer, and/or the like. The identified remediation action may depend on the merchant profile 208 and/or other factors related to the merchant. For example, the merchant may indicate, in the merchant profile 208, that the remediation action in the event of a post-charge fraud determination is to issue a refund. The merchant may further select the condition in which refund is to be given, such as for example, in all situations, or for certain goods, services, or purchase amounts. In some embodiments, the post-charge fraud detection system 204 automatically recommends or implements the remediation action.

In some embodiments, if a transaction is selected for being rescored, the payment engine 200 stalls the transfer of funds from the issuing bank. This may help avoid use of computer and network resources to make the initial transfer and then reverse or refund the transfer if the rescored transaction is found to be fraudulent. The stalling may also result in reduced network fees and/or elimination of disputes that may occur even if the merchant exercises a post-charge remediation within a certain time period.

Figure 3:
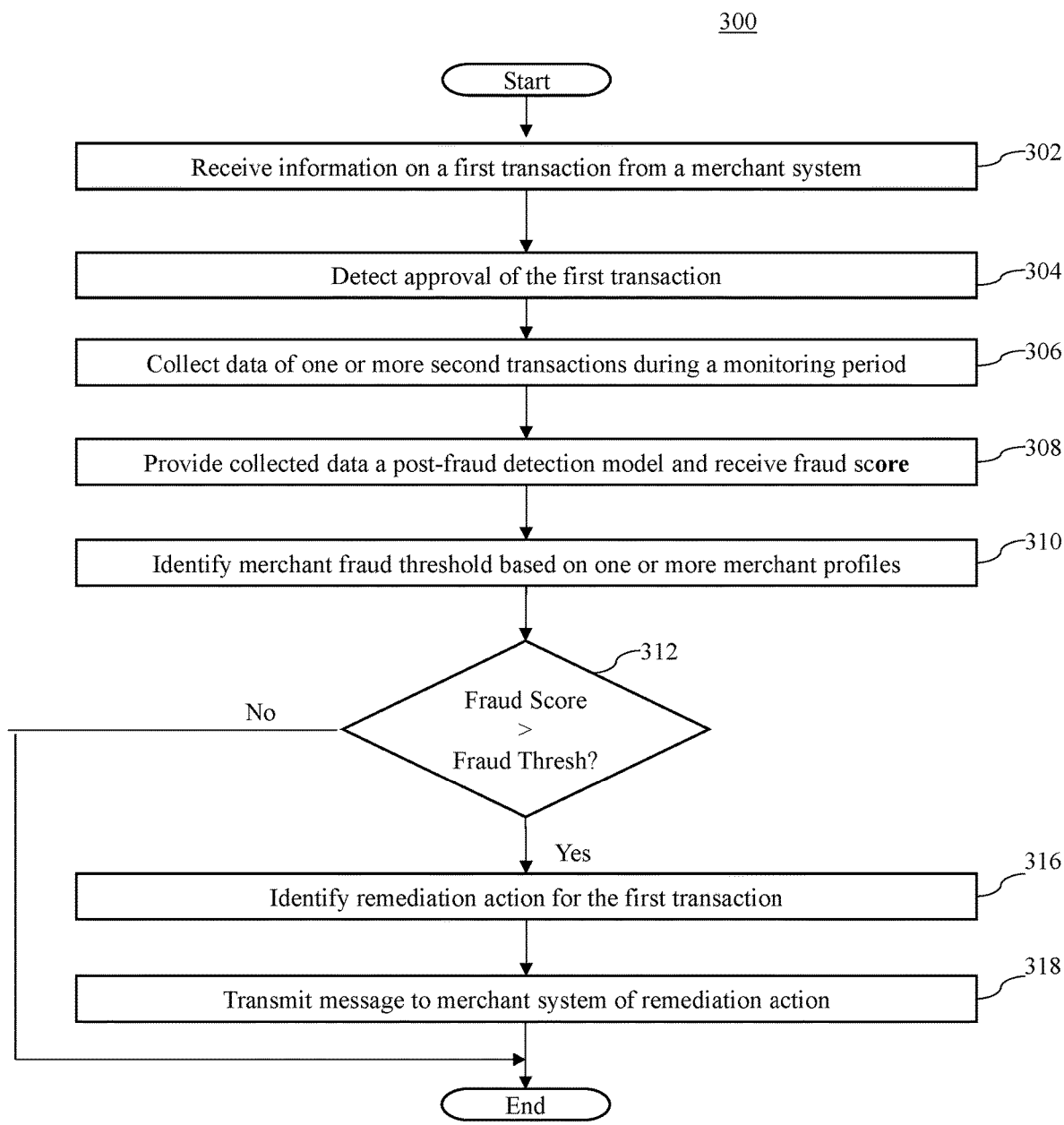
FIG. 3 depicts a flow diagram of a fraud remediation process according to one or more embodiments.

FIG. 3 depicts a flow diagram of a fraud remediation process 300 according to one or more embodiments. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and in act 302, the post-charge fraud detector system 204 receives information about a first transaction from the merchant system 102. The first transaction may be for purchase, by an end user, of products offered by the merchant. The end user may use the end user device 100 to access the merchant system 102 over the data communications network 108 to make the purchase. The payment for the purchase may be via a credit card. The information of the first transaction received by the system 204 may include, without limitation, customer information (e.g., name, shipping address, billing address, and the like), credit card information, purchase amount, and other information typically provided in a checkout page.

In act 304, the system 204 detects approval of the first transaction. The approval may include approval by the pre-charge fraud detection system 202 that the transaction is not predicted to be fraudulent, and/or approval by the bank system 106 of the credit card for the charge amount. In some embodiments, approval of the first transaction triggers the system 204 to start a monitoring period. In some embodiments, the approval that triggers the monitoring period may be the approval of the transaction prior to transfer of funds from the issuing bank to a recipient bank. The monitoring period may be a set amount of time, such as, for example, 24-hours.

In act 306, the server 204 monitors and collects data of second transactions occurring during the monitoring period using the credit card used for the first transaction. The monitoring may also be for other payment types associated or linked to the credit card. The collected data may include, for example, number and velocity of the second transactions using the credit card, addresses (e.g., IP, email, billing, mailing) associated with the second transactions, charge amounts, block rate for the second transactions, and/or the like.

In act 308, the server 204 may process the collected data and provide the processed data to a second machine learning model as input features. In some embodiments, other information is also provided to the second machine learning model as input features, including, for example, the pre-charge fraud score of the first transaction, the pre-charge fraud score of the second transactions, reason for blocking one or more of the second transactions, and/or information gathered during checkout of the first and second transactions.

The second machine learning model may receive the input features and classify the first transaction as fraudulent or not. The machine learning model may be, for example, a random forest that contains a number of decision trees. Each decision tree may make a prediction, based on at least a portion of the input features, as to whether the first transaction is fraudulent. The final fraud prediction may be based on the prediction of a majority of the decision trees.

In some embodiments, the second machine learning model is a neural network with two or more layers including an input layer, an output layer, and one or more intermediate layers. The input features may be provided to the input layer. The one or more intermediate layers may apply different functions to the input features to determine fraud. The output layer may output a fraud classification based on the results of the different functions.

In some embodiments, the output fraud classification may include a confidence value indicative of the confidence of the prediction. The output classification and the confidence value may be used to generate a fraud score. For example, a prediction that the first transaction is 90% fraudulent may translate to a fraud score of 0.9.

In act 310, the system 204 computes or retrieves (if already computed) a post-charge fraud threshold for the merchant from the merchant profile 208. The fraud threshold may be customized to the particular merchant based on the merchant's risk profile, margin profile, and/or recuperation profile. In other embodiments, a merchant may provide a fraud threshold that may be utilized for this step. In further embodiments, the fraud threshold may be computed based on identifying a merchant profile of the merchant, determining fraud thresholds associated with similar merchants (merchants with similar profiles), and then determining the fraud threshold based on the fraud thresholds used for similar merchants.

In act 312, a determination is made as to whether the fraud score is greater than the fraud threshold. If the answer is NO, no remediation action is taken with respect to the first transaction.

If the answer is YES, a remediation action is identified in act 316. The remediation action may be, for example, to issue a refund, contact the customer, and/or the like.

In act 318, a message about the remediation action is transmitted to the merchant system 102.

Figure 4:
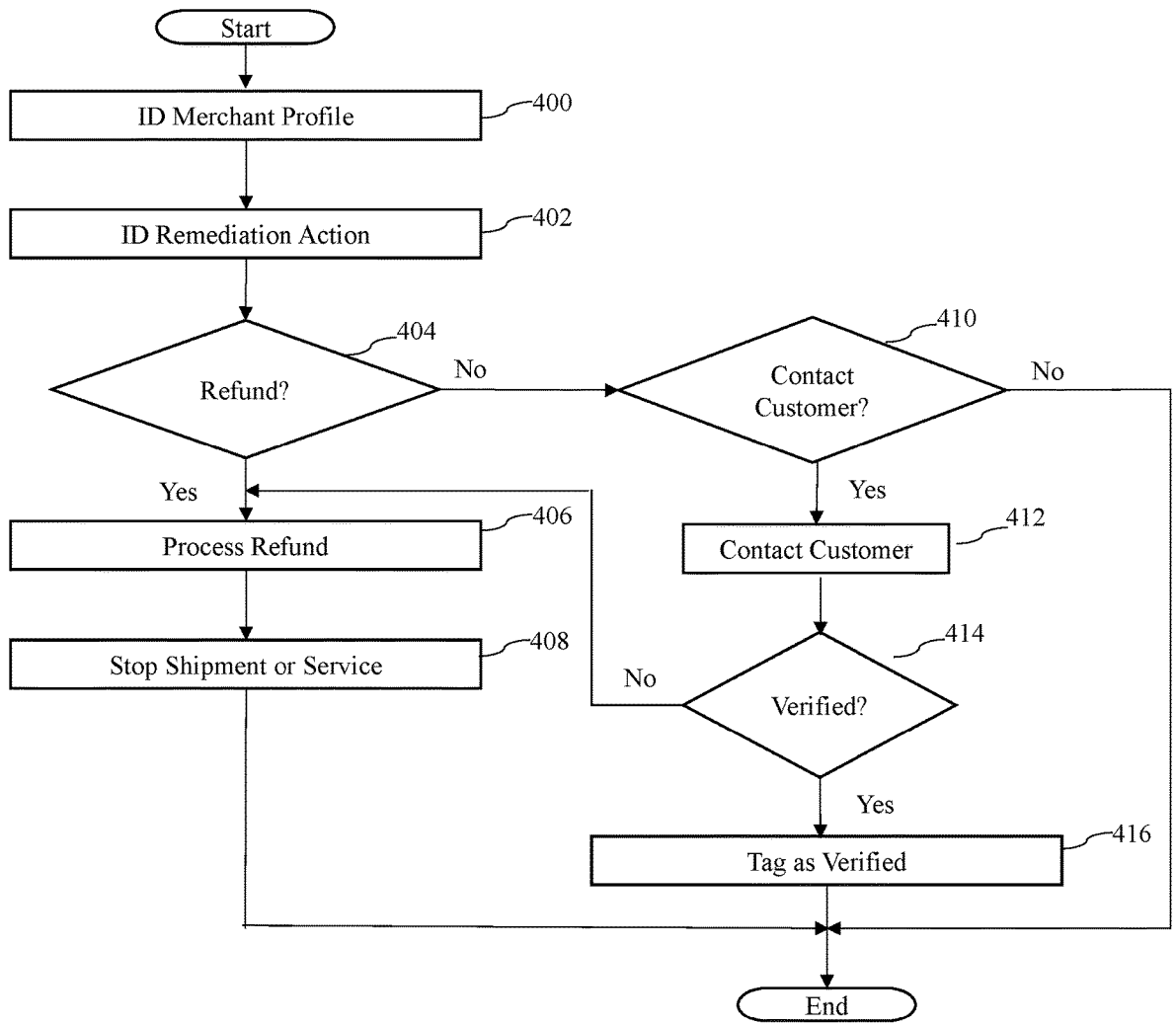
FIG. 4 depicts a flow diagram of a process for identifying and taking a remediation action for an approved transaction according to one or more embodiments.

FIG. 4 depicts a flow diagram of a process for identifying and taking a remediation action for an approved transaction (the first transaction) according to one or more embodiments. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and in act 400, the profile 208 for the merchant is identified. The profile 208 may include, for example, the merchant's preferred remediation actions, and/or rules for triggering certain remediation actions. For example, the profile 208 may state that for certain goods, services, and/or purchase amounts, a refund is to be issued as a remediation action, and for other goods, services, and/or purchase amounts, an email is to be sent to the customer for validating the purchase. Other remediations actions included in the profile 208 may include, for example canceling service or shipping for certain products, blocking the customer's credit card, IP address, and/or the like, from making future payments based on one or more rules, marking the payment of the first transaction as fraudulent for use as future training data, and/or the like. In some embodiments, the post-charge fraud detection system 204 also examines the fraud threshold and recommends a remediation action based on the fraud threshold.

In act 402, one or more remediation actions applicable to the transaction are identified by the system 204. In some embodiments, the system 204 may provide the identified remediation actions to the merchant system 102 for selection, via the merchant portal 206. In some embodiments, the system 204 may select one of the identified remediation actions to be implemented automatically if, for example, the merchant profile indicates that the selected remediation action is to be automatically taken in the absence of instructions otherwise from the merchant.

In act 404, a determination is made as to whether the selected remediation action is to issue a refund. If the answer is YES, the system 204 transmits, in act 406, a signal to the payment engine 200 for issuing the refund. The payment engine 200 may engage in further communications with the bank system 106 to reverse the transfer of funds from the issuing bank if such transfer has already occurred.

In act 408, the system 204 further transmits a message to the merchant system 102 to stop shipment of the product, deactivate a service (e.g., streaming service), deactivate a license (e.g., software license), or the like. In some embodiments the payment engine 200 may automatically execute appropriate computer instructions to stop the shipment, deactivate the service, or deactivate the license to avoid the loss of goods or services.

In act 410, a determination is made as to whether the selected remediation action is to contact the customer. If the answer is YES, the customer is contacted (e.g., via email), in act 412, with instructions to verify that the customer has authorized the purchase. For example, the customer may be asked to input a verification pin sent by the bank, or to transmit a picture of the credit card used for the purchase.

In act 414, the server 204 determines whether the purchase has been verified. If the answer is YES, the transaction is tagged as having been verified in act 416, and no remediation action is taken with respect to the transaction. A message may also be sent to the merchant system 102 indicating the verification of the purchase. Any stalled processes, such as stalled transfer of funds to the merchant bank, may also be allowed to proceed.

Referring again to act 414, if the answer is NO, and the transaction cannot be verified, the process returns, for example, to acts 406 and 408, to issue a refund and take steps to avoid loss of the product or service.

It should be appreciated that although FIG. 4 depicts issuing a refund or contacting the customer as two types of remediation actions, other remediation actions may also be taken in addition to, or in lieu of, issuing a refund or contacting the customer. The other remediation actions may include, for example, blocking the customer's credit card, IP address, and/or the like, from making future payments based on one or more rules, marking the payment of the first transaction as fraudulent for use as future training data, and/or the like.

Figure 5:
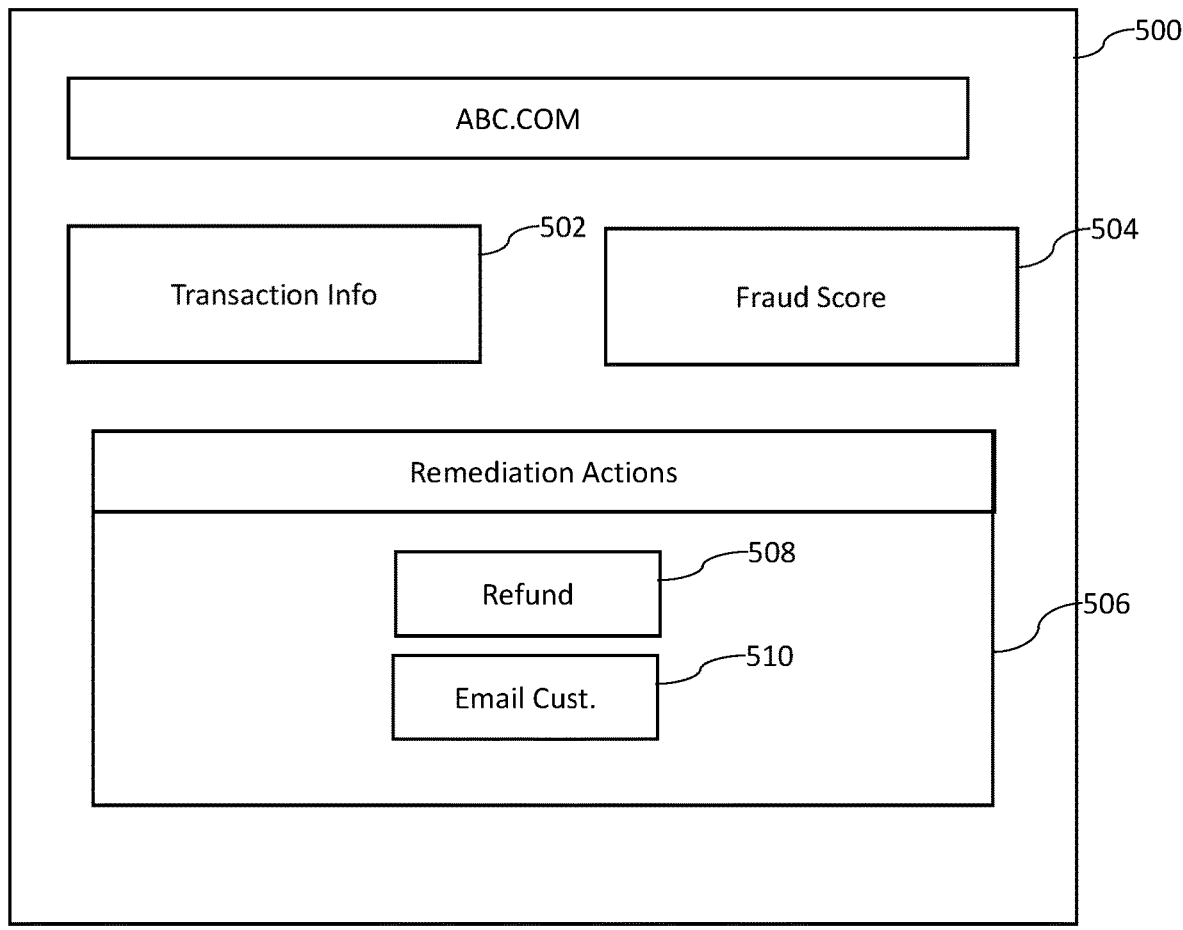
FIG. 5 depicts a graphical user interface provided by a merchant portal for display on a merchant system according to one or more embodiments.

FIG. 5 depicts a GUI 500 provided by the merchant portal 206 for display on the merchant system 102 according to one or more embodiments. The GUI 500 may provide a transaction information icon 502 and a fraud score icon 504. In response to detecting selection of the transaction information icon, the GUI 500 may provide information on a transaction that has been approved by the pre-charge fraud detection system 202 and the bank system 106, but which has been flagged as being fraudulent by the post-charge fraud detection system 204. The information may include customer information (e.g., name, shipping address, billing address, and the like), credit card information, purchase amount, and other information typically provided in a checkout page. In response to detecting the fraud score icon 504, the GUI 500 may provide a post-charge fraud score computed by the post-charge fraud detection system 204. The post-charge fraud score may be one that exceeds the merchant's fraud threshold.

In some embodiments, the GUI 500 further includes a remediation window 506. The remediation window 506 may provide recommendations on remediation actions that may be taken for the transaction whose post-charge fraud score exceeds the merchant's fraud threshold. For example, a refund icon 508 may be provided to allow the merchant to signal that a refund is to be provided for the fraudulent transaction. An email customer icon 510 may be provided to allow the merchant to contact the customer about the fraudulent transaction, and to give an opportunity to the customer to verify that the transaction has been authorized. In some embodiments, the specific remediations that are provided in the remediation window may depend on the remediations selected for the merchant according to the process of FIG. 4.

In some embodiments, the transaction processing system 104 discussed above, is implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for smart remediation of transactions have been specifically described and illustrated herein, many modifications and variations will be apparent to those skilled in the art. Accordingly, it is to be understood that systems and methods for smart remediation of transactions constructed according to principles of this disclosure may be embodied other than as specifically described herein. The disclosure is also defined in the following claims, and equivalents thereof.

What is claimed is:

1. A method comprising:
   training a second machine learning model by:
   training a first machine learning model, to detect fraudulent transactions before approval, using first training data,
   receiving, by a computing system and from one or more computing devices of a merchant system, information of a first transaction with a merchant,
   extracting, from the information of the first transaction, features to be input into the first machine learning model,
   invoking, based on the features, the first machine learning model to output a classification for the first transaction;
   determining an approval of the first transaction based on the classification for the first transaction;
   in response to determining the approval, collecting data of one or more second transactions during a monitoring period, that is a set amount of time after the approval of the first transaction, and training the second machine learning model using second training data that includes information based on the classification of the first transaction and the data of the one or more second transactions;
invoking the second machine learning model to determine a fraud score indicative of fraud for the first transaction;
computing a first fraud threshold for the merchant based on one or more merchant profiles associated with the merchant;
in response to determining that the fraud score is above the first fraud threshold, identifying a remediation action for the first transaction; and
transmitting a message associated with the remediation action to the merchant system.

2. The method of claim 1, wherein the data of the one or more second transactions include at least one of a velocity of charges during the monitoring period, address associated with the one or more second transactions, or fraud score for the one or more second transactions.

3. The method of claim 1, further comprising:
determining one or more second fraud scores based on information on the first transaction; and
determining that a second fraud score, of the one or more second fraud scores, is below a second fraud threshold.

4. The method of claim 3, wherein the determining the one or more second fraud scores includes:
providing the information on the first transaction to a third machine learning model; and
receiving a probability that the first transaction is fraudulent.

5. The method of claim 4, wherein the first machine learning model is independent from the third machine learning model.

6. The method of claim 1, wherein the one or more merchant profiles are customized for the merchant based on information about the merchant.

7. The method of claim 1, wherein the one or more merchant profiles include recuperation information for goods or services sold by the merchant.

8. The method of claim 1, wherein the one or more merchant profiles include information on expected margins for goods or services sold by the merchant.

9. The method of claim 1, wherein the one or more merchant profiles include a fraud risk level for the merchant.

10. The method of claim 1, wherein the remediation action includes providing a refund for the first transaction.

11. The method of claim 1, wherein the remediation action is automatically implemented on behalf of the merchant.

12. The method of claim 1, further comprising:
selecting, from a plurality of approved transactions and for reducing computing resources used for reassessment using machine learning, the first transaction for reevaluation based on information regarding the plurality of approved transactions,
wherein invoking the second machine learning model comprises invoking the second machine learning model based on selecting the first transaction.

13. The method of claim 1, further comprising:
selecting, from a plurality of approved transactions, the first transaction for reevaluation based on information regarding the plurality of approved transactions,
wherein the remediation action includes marking, for use as future training data for machine learning, an action of the first transaction.

14. The method of claim 1, further comprising:
selecting, from a plurality of approved transactions, the first transaction for reevaluation based on information regarding the plurality of approved transactions; and
stalling, to reduce usage of network resources, a process for the first transaction based on selecting the first transaction for reevaluation.

15. A system comprising:
memory; and
one or more processors, coupled to the memory, configured to cause the system to:
training a second machine learning model by:
training a first machine learning model, to detect fraudulent transactions before approval, using first training data,
receiving, from one or more computing devices of a merchant system, information of a first transaction with a merchant,
extracting, from the information of the first transaction, features to be input into the first machine learning model,
invoking, based on the features, the first machine learning model to output a classification for the first transaction;
determining an approval of the first transaction based on the classification for the first transaction;
in response to the approval, collecting data of one or more second transactions during a monitoring period, and
training the second machine learning model using second training data that includes information based on the classification of the first transaction and the data of the one or more second transactions;
invoking the second machine learning model to determine a fraud score indicative of fraud for the first transaction;
compute a first fraud threshold for the merchant based on one or more merchant profiles;
in response to determining that the fraud score is above the first fraud threshold, identify a remediation action for the first transaction; and
transmit a message associated with the remediation action to the merchant system.

16. The system of claim 15, wherein the data of the one or more second transactions include at least one of a velocity of charges during the monitoring period, address associated with the one or more second transactions, or fraud score for the one or more second transactions.

17. The system of claim 15, wherein the one or more processors further cause the system to:
provide the information on the first transaction to a second machine learning model; and
receive a probability that the first transaction is fraudulent.

18. The system of claim 15, wherein the one or more merchant profiles are customized for the merchant based on information about the merchant.

19. The system of claim 15, wherein the remediation action includes providing a refund for the first transaction.

20. The system of claim 15, wherein the remediation action is automatically implemented on behalf of a merchant associated with the merchant.

* * * * *